US008203409B2

(12) United States Patent
Zhong et al.

(10) Patent No.: US 8,203,409 B2
(45) Date of Patent: Jun. 19, 2012

(54) IRON CORE REACTOR

(75) Inventors: Juntao Zhong, Xinjiang (CN); Yumin Ren, Xinjiang (CN); Xingyao Gao, Xinjiang (CN); Chunzhen Gu, Xinjiang (CN); Shubo Sun, Xinjiang (CN)

(73) Assignee: Tebian Electric Apparatus Stock Co., Ltd, Xinjiang (CN)

( * ) Notice: Subject to any disclaimer, the term of this patent is extended or adjusted under 35 U.S.C. 154(b) by 125 days.

(21) Appl. No.: 12/674,407

(22) PCT Filed: Jun. 26, 2008

(86) PCT No.: PCT/CN2008/001228

§ 371 (c)(1),
(2), (4) Date: May 7, 2010

(87) PCT Pub. No.: WO2009/024008

PCT Pub. Date: Feb. 26, 2009

(65) Prior Publication Data

US 2011/0217209 A1 Sep. 8, 2011

(30) Foreign Application Priority Data

Aug. 20, 2007 (CN) .......................... 2007 1 0138791

(51) Int. Cl.
*H01F 27/36* (2006.01)
*H01F 38/12* (2006.01)
*H01F 38/30* (2006.01)
*G01V 3/10* (2006.01)

(52) U.S. Cl. ................... 336/84 R; 336/84 C; 336/84 M

(58) Field of Classification Search .............. 336/55–62, 336/84 M, 84 C, 84 R
See application file for complete search history.

(56) References Cited

U.S. PATENT DOCUMENTS

| | | | | |
|---|---|---|---|---|
| 3,156,624 | A * | 11/1964 | Clifford et al. | 376/341 |
| 3,703,692 | A * | 11/1972 | Peschel | 336/134 |
| 4,142,230 | A * | 2/1979 | Menju et al. | 363/51 |
| 4,145,679 | A * | 3/1979 | Mitchell, Jr. | 336/57 |
| 2008/0044323 | A1 * | 2/2008 | Rosas | 422/193 |

FOREIGN PATENT DOCUMENTS

| | | | |
|---|---|---|---|
| CN | 2263411 | Y | 9/1997 |
| CN | 1162183 | A | 10/1997 |
| CN | 1169579 | A | 1/1998 |
| CN | 1243324 | A | 2/2000 |
| EP | 0795877 | A2 | 9/1997 |
| GB | 2326028 | A | 9/1998 |
| JP | 58130512 | A | 8/1983 |
| JP | 06302442 | A * | 10/1994 |

* cited by examiner

*Primary Examiner* — Anh Mai
(74) *Attorney, Agent, or Firm* — The Webb Law Firm

(57) ABSTRACT

An iron core reactor includes reactor active parts. The reactor active parts include two or more separate reactor active parts. The coils in the respective active parts are connected in series or in parallel. The respective active parts are placed in a same reactor oil tank.

13 Claims, 11 Drawing Sheets

IRON CORE REACTOR

TECHNICAL FIELD

The present invention relates to the field of reactors, and particularly to an iron core reactor.

BACKGROUND

The current single-phase iron core reactor is an assembly of a single "EI" shaped iron core and a single coil. This structure is suitable for the reactor whose operation voltage and capacity are below certain values respectively. However, when the voltage level and the capacity of a reactor reach a certain degree (e.g., a reactor in which the voltage level is 800 kV, and the capacity is 100000 kvar), as the reactor becomes larger and larger, the width and height of the reactor further increase, which brings difficulty to transportation of the reactor. In addition, since the creepage distance of the insulating member of the reactor is limited, it is not allowed that the voltage unlimitedly increases in a certain insulating distance. When the voltage level of the reactor further increases, the creepage voltage applied onto the insulating member correspondingly increases, which brings hidden danger to the reactor.

Furthermore, in the current reactor, the leading-out wire of the coil is supported by the insulating battens fixed on the upper and lower yokes (the frame of the "EI" shaped iron core) that clamp the iron core. When the voltage level reaches a certain degree, the creepage distance of the leading-out wire is limited, and the creepage voltage of the insulating battens with respect to the ground is high, which more possibly causes unreliability of reactor operation.

In addition, the walls of the oil tank, which is used to contain the active part of the reactor in prior art, are single-layer. This structure is limited for the system voltage and for preventing the noise and the vibration of the reactor body. When the voltage and the capacity applied on the iron core reactor reach a certain degree, since there is limitation on the transport and the insulating material, a single iron core and a single coil cannot satisfy the requirement for the transport and the insulation of the reactor with high voltage and large capacity. For the reactor with large capacity, the electromagnetic force of the iron core cakes of the single iron core and the vibration caused by the force are difficult to be controlled. Meanwhile, the vibration and the noise generated by the iron core are transferred to outside of the oil tank through the solid part and the insulating oil, which cannot satisfy the environmental protection requirement of the operation of the power system.

SUMMARY

The problem to be solved in the present invention is to provide an iron core reactor, which is assembled relatively simple, easy to be transported, has smaller is magnetic leakage loss, and operates reliably in comparison with the defects existing in the single-phase iron core reactor in the prior art.

The technical solution to solve the problem in the present invention is that an iron core reactor comprises a reactor active part, wherein the reactor active part comprises two or more separate active parts, and coils in the active parts are connected together.

The coils in the active parts can be connected together in series, and also can be connected together in parallel. That is, the connection manner of the coils can be serial, and also can be parallel.

When two active parts are used in the reactor, the manner of coupling the coils in the two active parts together in series can be that one end of the first coil in the first active part is a leading-in end, the other end of the first coil is connected to one end of the second coil in the second active part, and the other end of the second coil is a leading-out end, thereby a serial connection is formed; the serial connection also can be that the first coil is connected to the second coil in series by using leading-in wires in the middle of the coils, i.e., the first coil employs a leading-in wire in the middle of the coil and leading-out wires in both ends of the coil, and the leading-out wires of the first coil are connected in parallel to be a leading-in wire of the second coil, the second coil employs the leading-in wire in the middle of the coil and leading-out wires in both ends of the coil, the leading-out wires in both ends of the second coil are connected in parallel, and the parallel connection between the leading-out wires in both ends of the first coil is connected to the leading-in wire in the middle of the second coil in series.

When the two coils in the two active parts are connected in series in the present invention, in the condition that the transporting height is satisfied, the number of the coil segments of the two coils is more than total number of the coil segments of the single-limb coil, and the total height of the coils is increased, thereby the creepage distance on the surface of the coils in the operation voltage is greatly increased. Thus, both of the coils bear the operation voltage, so as to guarantee the insulating reliability of the reactor in the operation voltage.

When two active parts are used in the reactor, the manner of coupling the coils in the two active parts together in parallel can be that the ends of the coils are connected in parallel, i.e., one end of each of the two coils in the two active parts is a leading-in end thereof and is connected together in parallel as a leading-in end, the other end of each of the two coils in the two active parts is a leading-out end thereof and is connected together in parallel as a leading-out end; the parallel connection also can be that both the first coil in the first active part and the second coil in the second active part employ leading-in wires in the middle of the coils, and the leading-in ends in the middle of the two coils are connected in parallel, the upper end and the lower end of each coil are connected together in parallel respectively and then the parallel connections of the two coils are connected in parallel as a leading-out end, that is, the first coil employs a leading-in wire in the middle of the coil, the upper end and the lower end of the first coil are the leading-out ends and are connected in parallel, the second coil employs a leading-in wire in the middle of the coil, the upper end and the lower end of the second coil are the leading-out ends and are connected in parallel, the leading-in ends in the middle of the first coil and the second coil are connected in parallel, and the two ends of the first coil and the two ends of the second coil are connected in parallel as a leading-out end.

In the condition that the requirements for transport and electric performance are satisfied, the parallel connection manner can be employed. When the middle leading-in manner is employed, the requirement for the insulating level of the ends of the coils is not high.

When more active parts are used in the reactor, the coils in the active parts are connected in series or in parallel, the structures of the coils in the active parts of the reactor are similar to the structures of the coils in the above double active parts structure.

Certainly, the connection manner of the coils in the present invention is not limited to the above four manners.

Preferably, the arrangement mode of the active parts can be a parallel one. A leading-out wire (connection between the two coils) can be away from the ground potential by using such parallel arrangement, and the diameter of the electrode of the leading-out wire can be decreased. Alternatively, the arrangement of the two active parts can be an in-line one. By using such in-line arrangement, the interference of the magnetic leakage between coils in the active parts is small.

Certainly, the arrangement manner of the active parts of the reactor in the present invention can be other ones.

In the present invention, each of the separate active parts comprises an "EI" shaped iron core respectively, in the middle of which an iron core limb is formed by the lamination of a plurality of iron core cakes with central holes and a plurality of air gaps.

The active parts of the reactor are placed in a same reactor oil tank. When two active parts are used in the reactor, since the effective voltages of the two active parts under the operation voltage are different from each other, the insulating distances of the two active parts are different from each other. Thus, the two active parts can be a bigger one and a smaller one. When the two active parts are in a serial structure, according to the detailed condition, the voltage capacity of the first active part can be 30-70% of the whole voltage capacity of the reactor, and the voltage capacity of the second active part can be 70-30% of the whole voltage capacity of the reactor. Naturally, the two active parts can have the same size.

Preferably, in the present invention, leading-out devices of the coils can be connected to the active parts of the reactor directly. Specifically, the leading-out devices can be connected to a position on the external diameter of the coils in the active parts of the reactor. The leading-out device comprises a U-shaped insulating plate, and a metal voltage-sharing shield insulation layer covering outside the U-shaped insulating plate. In the leading-out device, the U-shaped insulating plate can be replaced by a cylindrical insulating plate. However, the U-shaped insulating plate is obtained by improving the cylindrical insulating plate. The object of the improvement is to increase the diameter of an electrode, improve the distribution of the electric field, and decrease the distance to the ground. In addition, in comparison with the cylindrical insulating plate, the U-shaped insulating plate can save the space and the material.

More preferably, the leading-out device can comprise a surrounding insulating layer covering outside the metal voltage-sharing shield insulation layer, and an oil gap is formed between the surrounding insulating layer and the metal voltage-sharing shield insulation layer. The object of using the surrounding insulating layer is to divide the insulating oil gap, improve the distribution of the electric field, decrease the insulating distance, and save the material.

Further more preferably, the structure of the reactor oil tank can be a structure in which a double-layer oil tank wall can be used locally. In this structure, a plurality of battens is set on the inner surface of the oil tank wall, and a second oil tank wall is fixed on the battens.

The battens include transverse battens and longitudinal battens, which form a plurality of grids. The second oil tank wall is constructed by covering plates whose sizes correspond to the sizes of the grids on the grids.

The battens are made of metal. The size of each transverse batten is as follows: length×width=650 mm×50 mm, and the thickness is 4-50 mm. The length of the longitudinal batten is relative to the height of the reactor oil tank, and usually can be determined according to the practice. The width can be 50 mm.

Furthermore, radiators can be connected to the reactor oil tank. The radiators can be distributed on one side or two sides of the reactor oil tank symmetrically, or around the reactor oil tank.

A cooler with fan or a water cooler can be used to cool down the transformer oil in the present invention.

Since a double active parts structure or a multiple active parts structure is employed in the present invention, the press tightness of the limb and the clamp tightness of the iron yokes can be guaranteed. Thus, the noise and the vibration can be controlled. Meanwhile, the defect that the concentration of the loss of the reactor with a single active part whose capacity is the same as that of the present invention can be improved, and the temperature distribution of the whole reactor can be improved, thereby the defect that local hot spot exists in the active part is avoided (local overheating is relevant with the size of the magnetic leakage, and the magnetic leakage of the reactors with different capacities have different sizes. The bigger the capacity is, the more the magnetic leakage will be. When two active parts are used in the reactor, it is equivalent to that the capacity of each active part is reduced by half, and the relative magnetic leakage is reduced by half.).

Since the leading-out device is directly fixed onto the reactor active part in the present invention, it overcomes the defect that the margin of the creepage distance of the insulating material is small in the condition of a limited allowable transport height. Thus, the problem of the creepage of the supporting insulating battens used in the structure of the prior art with respect to the ground is avoided, thereby the operation reliability of the high-voltage reactor is guaranteed.

The local double-layer reactor oil tank structure in the present invention limits that the noise and the vibration caused by the electromagnetic force of the iron core cakes and the magnetic retardation streching of the iron yokes are transferred to the oil tank and the outside of the oil tank when AC current flows in the reactor. The cross-connected metal battens in the double-layer oil tank structure are used to divide the area of the whole first-layer oil tank wall; thereby the vibration amplitude of the steel surface of the oil tank wall is decreased. Meanwhile, the double-layer reactor oil tank structure is useful in insulating the noise caused by the iron core, which satisfies the environmental protection requirement of the operation of the power system.

Since two or more active parts are used in the reactor of the present invention, the capacity of a single limb iron core is decreased, and this active parts structure is advanced in the control of the magnetic leakage and the heat radiation of the windings. Thus, this structure can be used in any reactor with different voltage levels and capacity requirements. For the reactor with 1000 kV and 100000 kvar, this structure can satisfy the requirements for the insulating reliability and the transport.

REFERENCE NUMERALS

1—high voltage bushing, 2—neutral point high voltage bushing, 3—reactor body, 4—oil storage, 5—radiator, 6—oil tank, 7—iron core, 8—coil, 9—iron core cake, 10—iron core limb, 11—first coil, 12—second coil, 13—leading-out device, 14—oil tank wall, 15—batten, 16—to second oil tank wall, 17—arc-shaped plate, 18—support arm, 19—U shaped insulating plate, 20—metal voltage-sharing shield insulation layer, 21—surrounding insulating layer, 22—oil gap, 23—support insulating block for oil gap, 24—lead wire, 25—bushing, 26—insulating plate, 27—insulating tie wrap, 28—support bar, 29—support plate, 30—clamp plate

DETAILED DESCRIPTION

The present invention will be described in detail in the combination of the embodiments and the drawings.

The following embodiments are non-limited embodiments.

Figure 1:
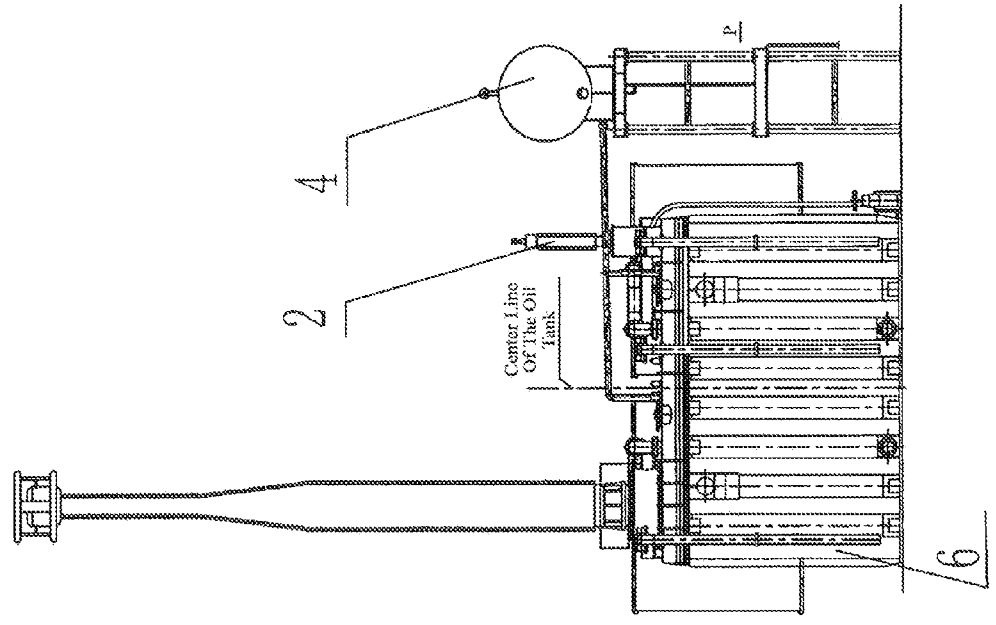
FIG. 1 is a plan view of the active parts structure of the iron core reactor in the embodiment of the present invention (two active parts are used).
Figure 2:
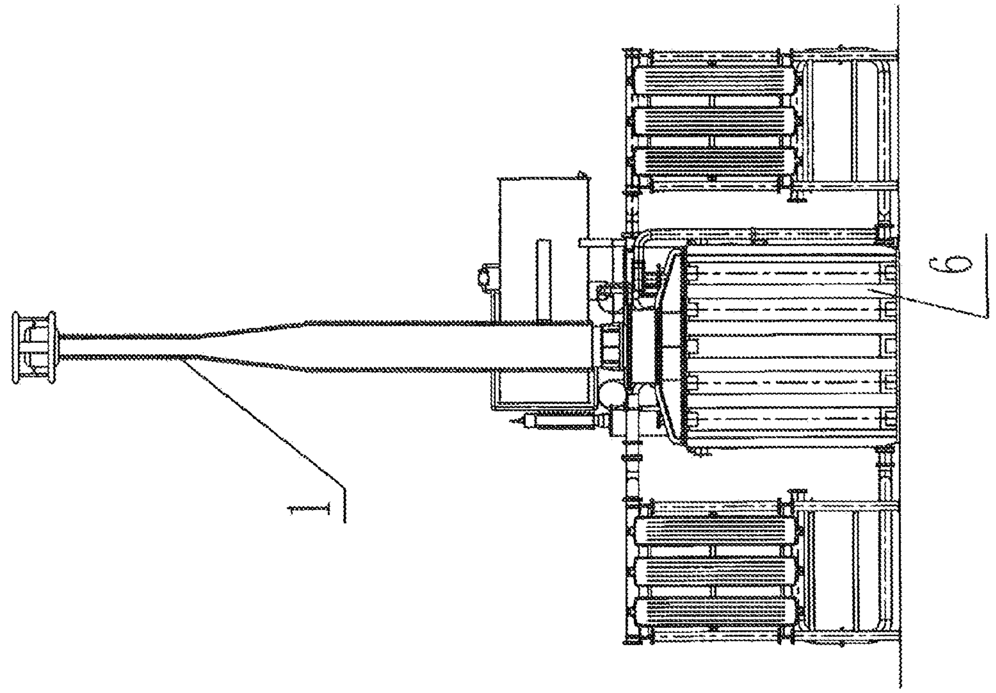
FIG. 2 is a side view of FIG. 1.
Figure 8:
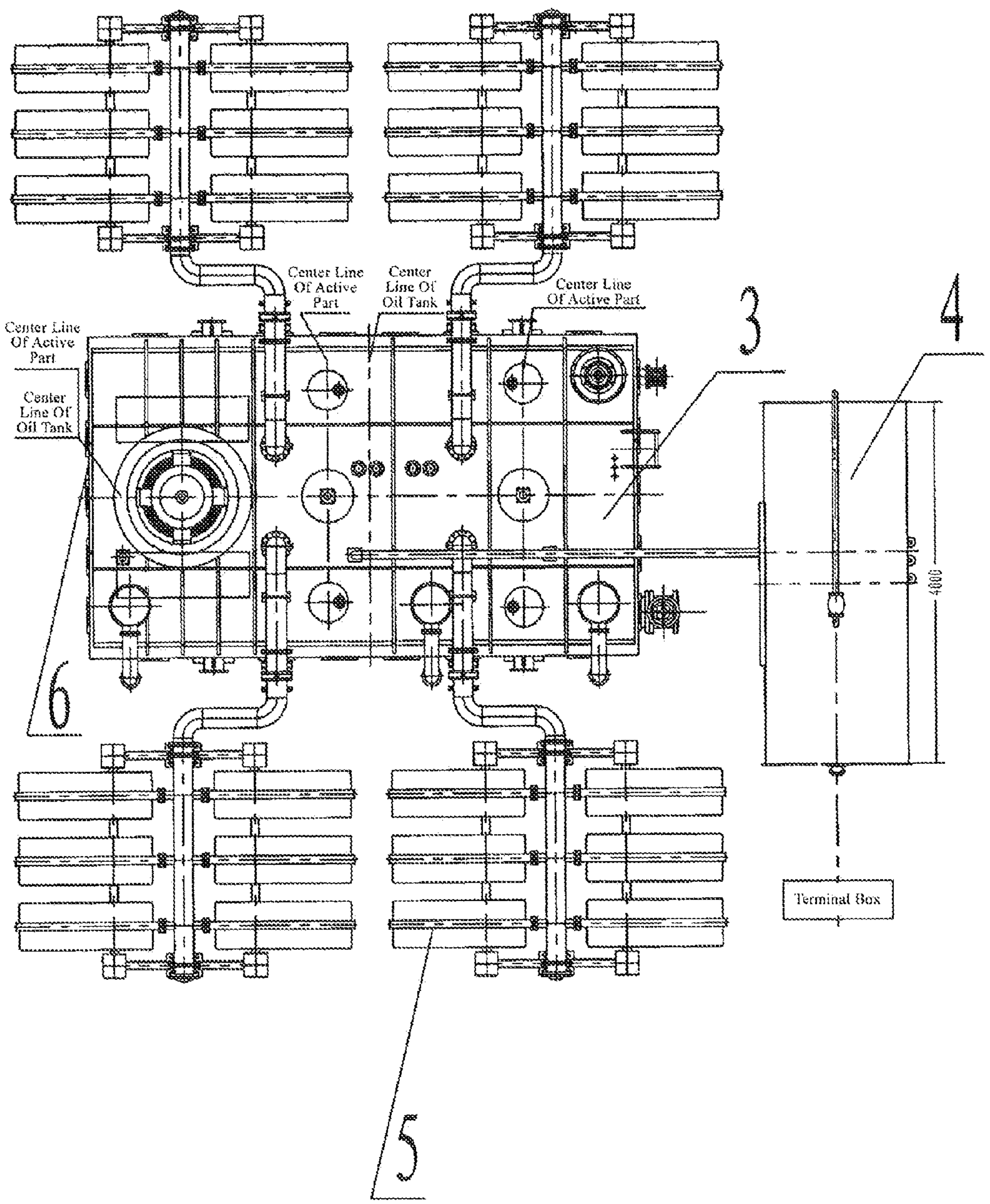
FIG. 8 is a top view of the iron core reactor in the embodiment of the present invention (which has four sets of radiators).

As shown in FIGS. 1, 2 and 8, in this embodiment, the iron core reactor comprises a reactor body 3, an oil storage 4 and a radiator 5. The reactor body 3 comprises active parts, and in this embodiment, a double active parts structure is used, that is, two separate active parts are used. The two active parts are connected together through the coils in them. Both of the active parts are placed in the oil tank 6, which is connected to the oil storage 4.

As shown in FIGS. 3-7, in the double active parts structure of the reactor in this embodiment, each active part comprises an "EI" shaped iron core 7 and a coil 8. In the middle of each "EI" shaped iron core, a plurality of iron core cakes 9 with central holes and a plurality of air gaps are laminated to be an iron core limb 10. The iron core limb 10 is tightened by a plurality of tensile rods which pass through the central holes. The upper and lower sides and the left and right sides of the "EI" shaped iron core 7 are laminated by the iron core with a certain thickness, and are tightened by cross-core screw-rods. The iron core limb 10 is inserted into the coil 8.

Figure 3:
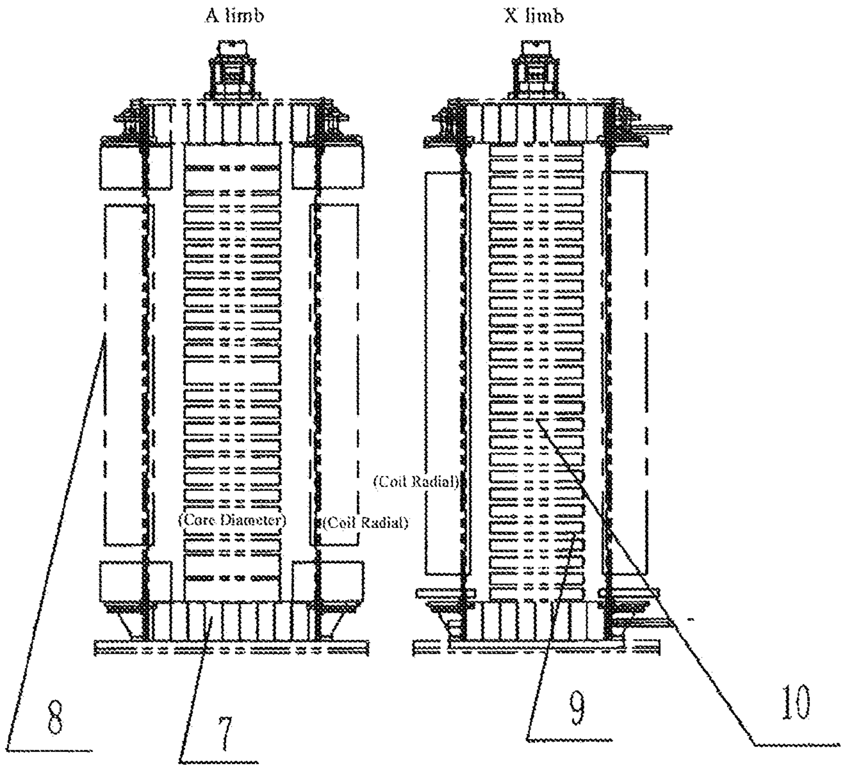
FIG. 3 is a plan view of the double active parts structure of the iron core reactor in the embodiment of the present invention (two active parts are used, and the two active parts are arranged in parallel).
Figure 4:
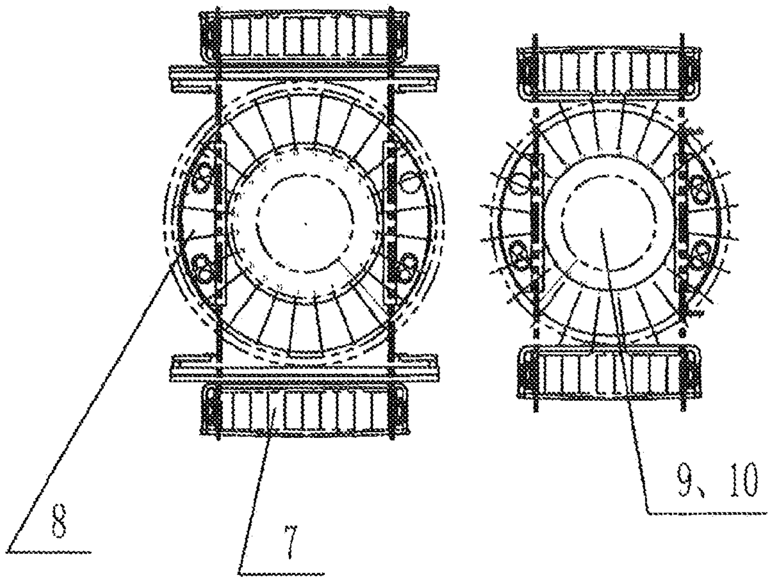
FIG. 4 is a top view of FIG. 3.
Figure 5:
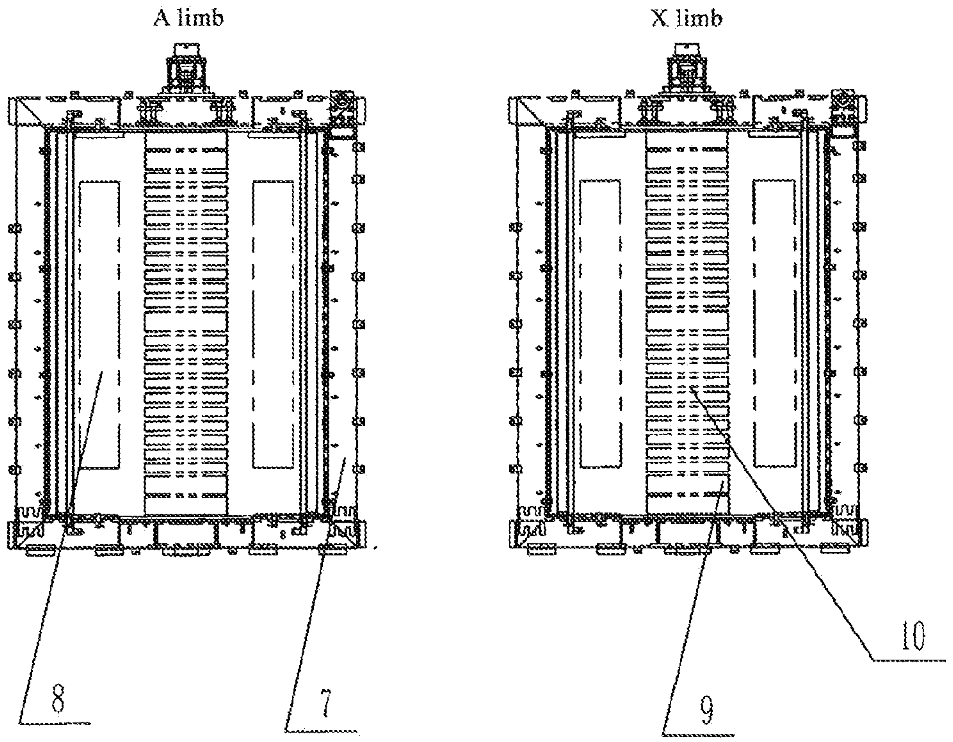
FIG. 5 is a plan view of the double active parts structure of the iron core reactor in the embodiment of the present invention (two active parts are used, and the two active parts are arranged in in-line).
Figure 6:
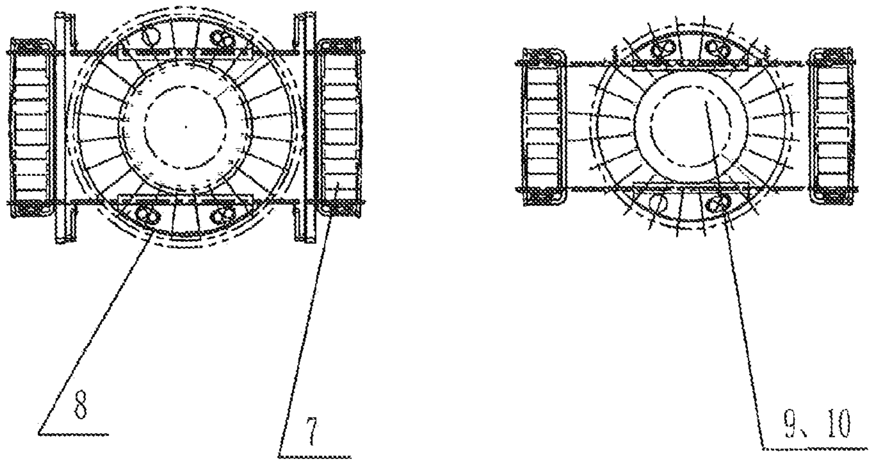
FIG. 6 is a top view of FIG. 5.
Figure 7:
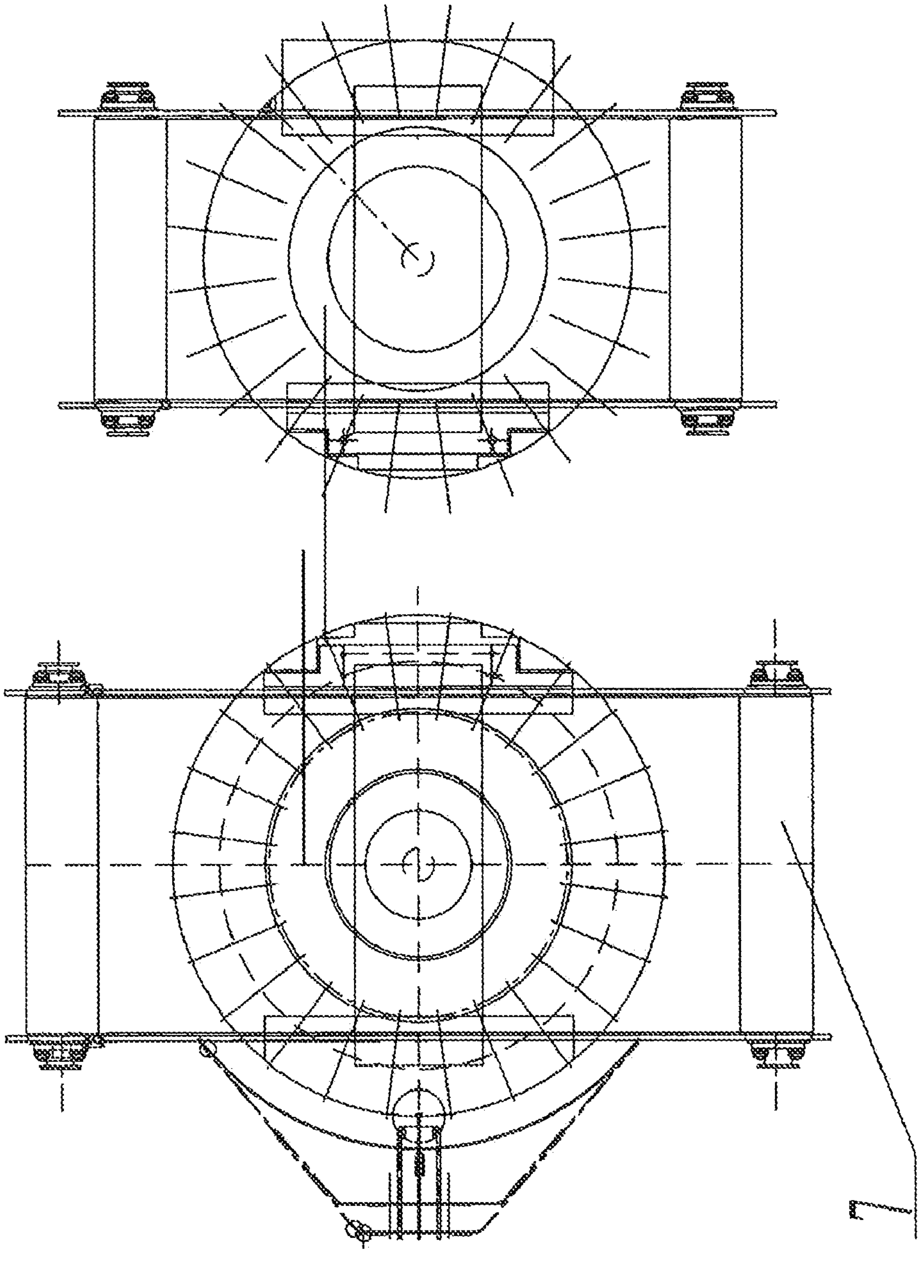
FIG. 7 is an enlarged view of FIG. 4.

The two active parts can be arranged in parallel (as shown in FIGS. 3 and 4) or in in-line (as shown in FIGS. 5 and 6).

The coils 8 of the two active parts are connected in series or in parallel.

Figure 10:
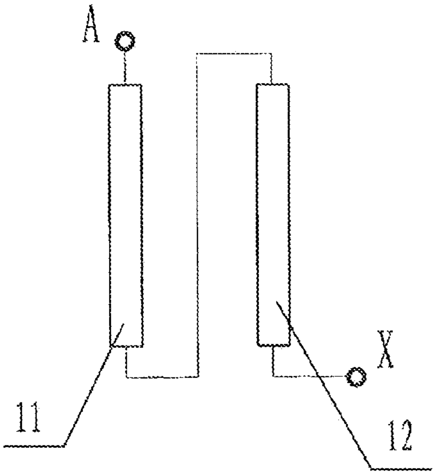
FIG. 10 is a view of the two coils with leading-in wires in the ends connected in series in the embodiment of the present invention.

FIG. 10 shows the serial connection manner. One end of the coil in the first active part, i.e., the first coil 11, is a leading-in end, the other end of the first coil 11 is connected to one end of the coil in the second active part, i.e., the second coil 12, and the other end of the second coil 12 is a leading-out end, so that a serial connection is formed.

Figure 12:
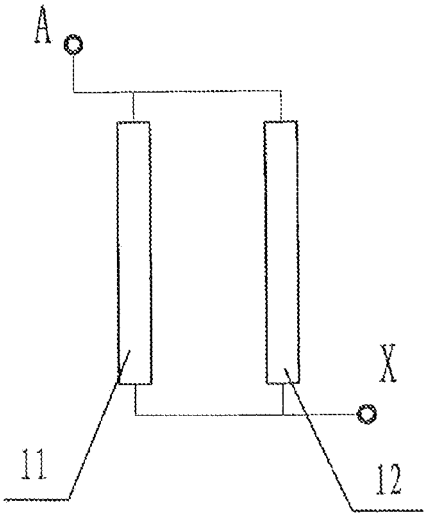
FIG. 12 is a view of the two coils with leading-in wires in the ends connected in parallel in the embodiment of the present invention.

FIG. 12 shows the parallel connection manner. The manner of coupling the is coils in the two active parts together in parallel is that the leading-in ends of the two coils are connected together in parallel to be a leading-in end, and the leading-out ends of the two coils are connected together in parallel to be a leading-out end; the first coil 11 and the second coil 12 are connected by connecting the leading-out wires in the ends of the coils in parallel, that is, one of the two ends of each of the first coil 11 and the second coil 12 is a leading-in end, and the other of the two ends of each of the first coil 11 and the second coil 12 is a leading-out end, then the two coils are connected in parallel.

The above two connection manners are suitable for the reactor with high capacity and low voltage. The structure of the reactor can be simplified through such connection manners.

Figure 9:
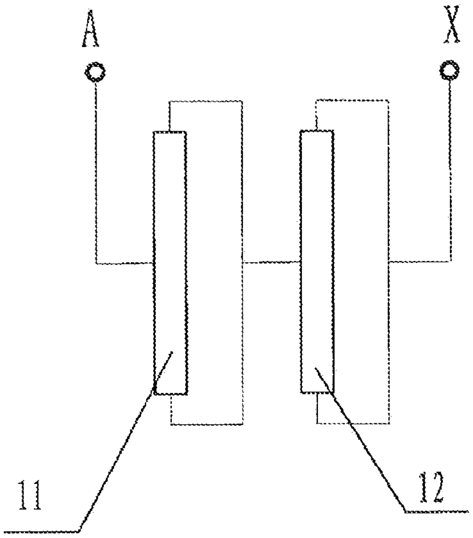
FIG. 9 is a view of the two coils with leading-in wires in the middle connected in series in the embodiment of the present invention.
Figure 11:
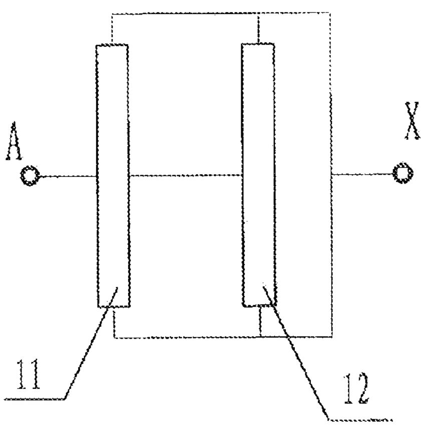
FIG. 11 is a view of the two coils with leading-in wires in the middle connected in parallel in the embodiment of the present invention.

The connection manner shown in FIG. 9 or 11 is used in this embodiment.

FIG. 9 shows the serial connection manner. The first coil 11 is connected to the second coil 12 in series by using leading-in wires in the middle of the coils, i.e., the first coil 11 employs a leading-in wire in the middle of the first coil 11 and leading-out wires in both ends of the first coil 11, and the leading-out wires of the first coil 11 are connected in parallel, the second coil 12 employs the leading-in wire in the middle of the second coil 12 and leading-out wires in both ends of the second coil 12, the leading-out wires in both ends of the second coil 12 are connected in parallel, and the parallel connection between the leading-out wires in both ends of the first coil 11 is connected to the leading-in wire of the second coil 12 in series.

FIG. 11 shows the parallel connection manner. The first coil 11 and the second coil 12 are connected in parallel by employing leading-in wires in the middle of the coils. The parallel connection can be that both of the coil in the first active part, i.e., the first coil 11, and the coil in the second active part, i.e., the second coil 12 employ leading-in wires in the middle of the coils, and the leading-in ends in the middle of the two coils are connected in parallel, the upper end and the lower end of each coil are connected together in parallel respectively and then the parallel connections of the two coils are connected in parallel as a leading-out end, that is, the first coil 11 employs a leading-in wire in the middle of the first coil, the upper end and the lower end of the first coil 11 are the leading-out ends and are connected in parallel, the second coil 12 employs a leading-in wire in the middle of the second coil, the upper end and the lower end of the second coil 12 are the leading-out ends and are connected in parallel, the leading-in ends in the middle of the first coil 11 and the second coil 12 are connected in parallel, and the two ends of the first coil 11 and the two ends of the second coil 12 are connected in parallel as a leading-out end.

The above two connection manners are suitable for the reactor with large capacity and high voltage, and can guarantee that the reactor has a good performance in heat radiation and the insulating performance is reliable.

Figure 13B:
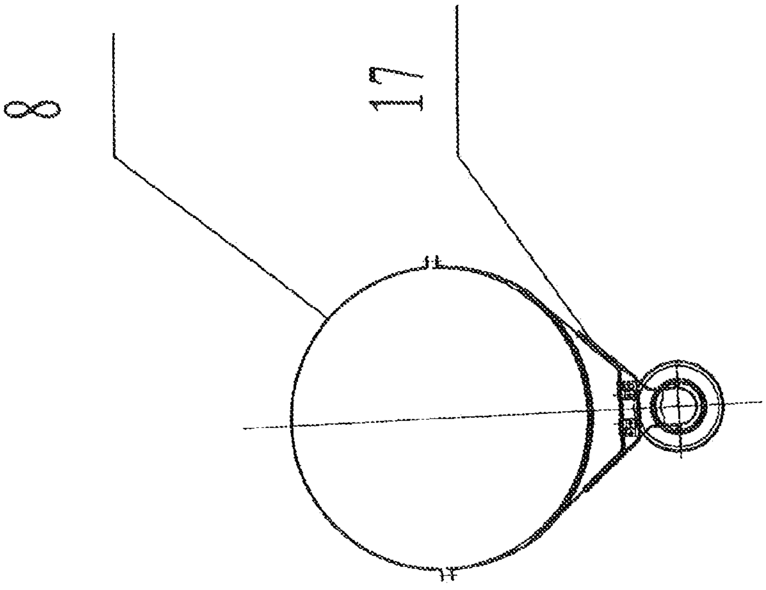
FIG. 13B is a top view of FIG. 13A.
Figure 13A:
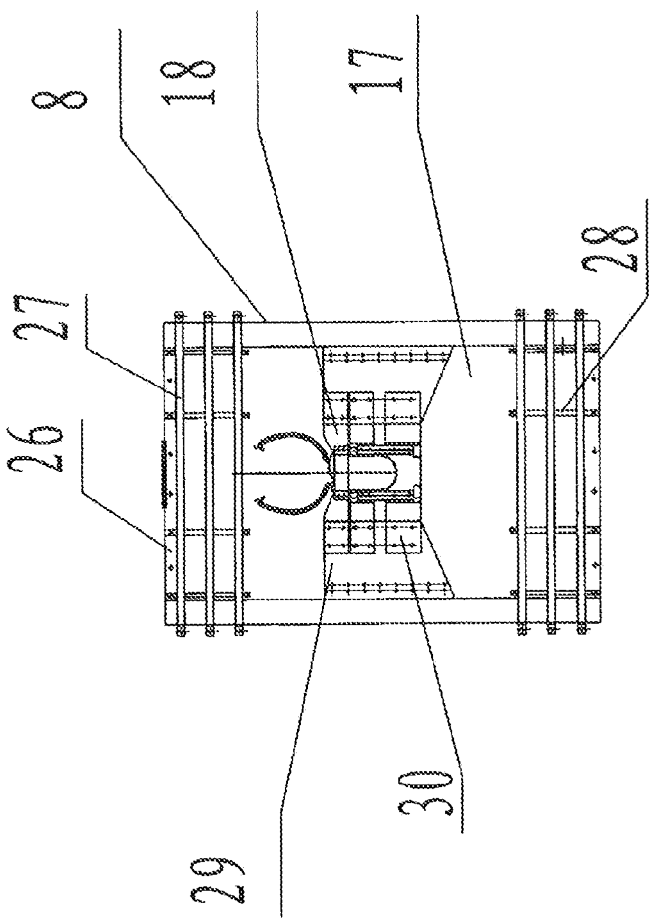
FIG. 13A is a plain view of a mounting structure of the leading-out device in the embodiment of the present invention.
Figure 14:
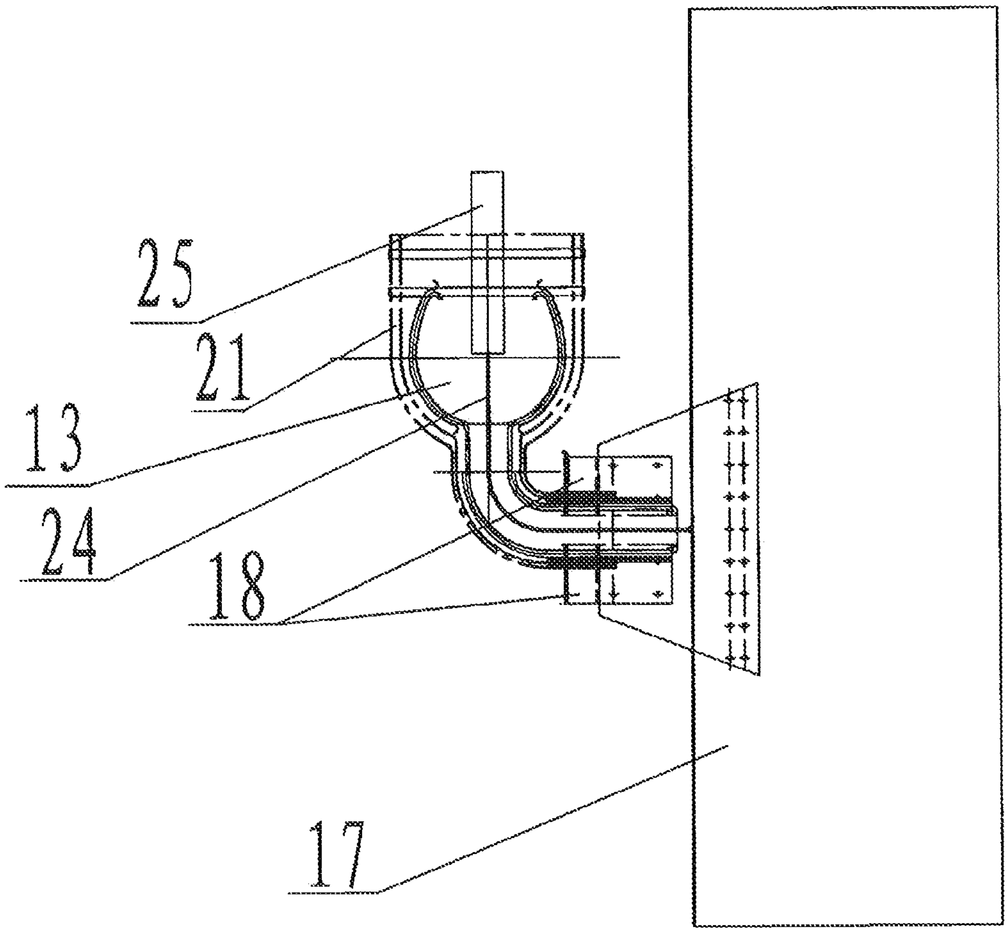
FIG. 14 is a view of a structure in which the leading-out device is mounted onto an arc-shaped plate in the embodiment of the present invention (the leading-out device is shown in a schematic view).

As shown in FIGS. 13 A and 13B, the leading-out device 13 is colligated in the external-diameter side of the coil in a reactor active part through an arc-shaped plate 17 made of an insulating paper plate as a bracket of the whole leading-out device 13. As shown in FIG. 14, a support plate 29 made of an insulating paper plate is mounted in the middle of the two edges of the arc-shaped plate 17 in the axial direction of the arc-shaped plate 17. A clamp plate 30 made of an insulating paper plate is fixed onto the support plate 29. Two upper and lower support arms 18 made of insulating paper plates are set on the clamp plate 30. The two upper and lower support arms 18 support the leading-out device 13.

Figure 15:
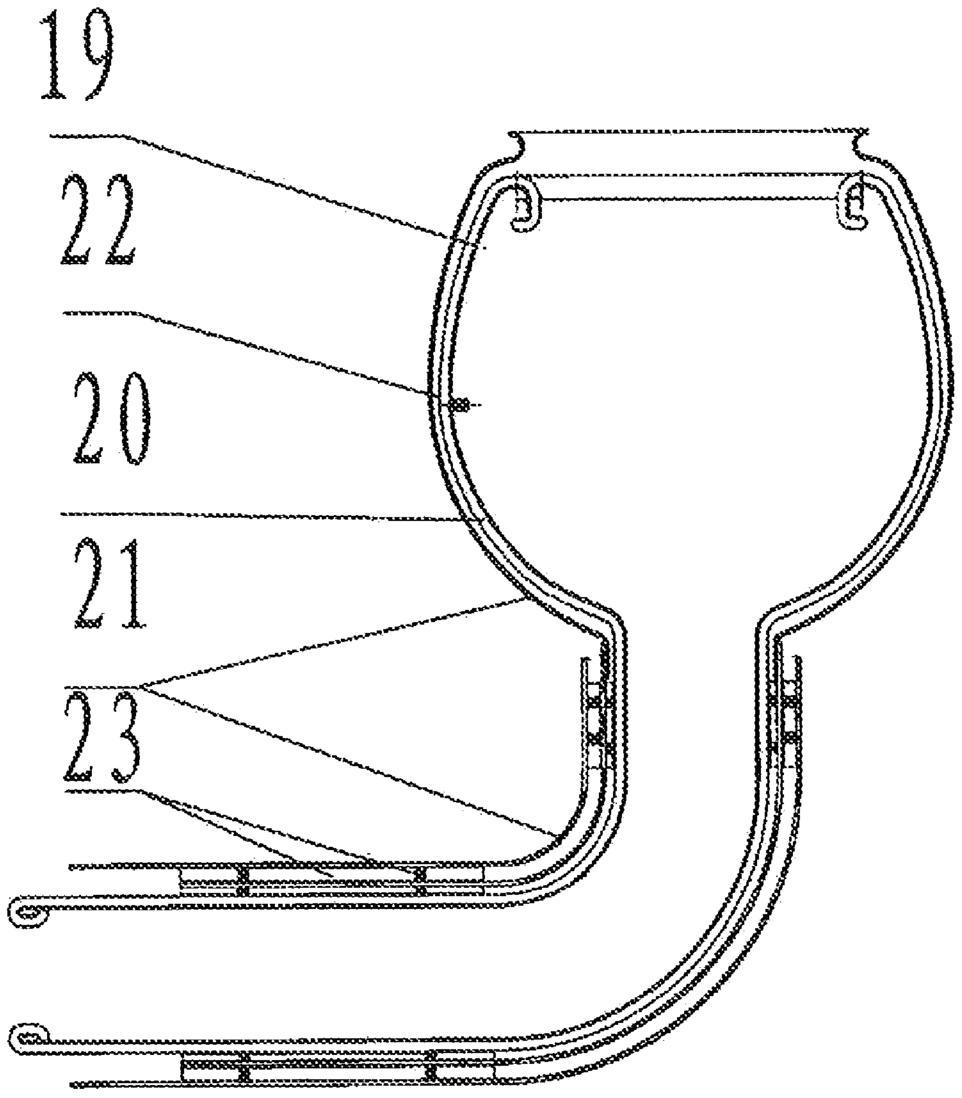
FIG. 15 is a view of a structure of the leading-out device in the embodiment of the present invention.

As shown in FIG. 15, the leading-out device 13 comprises a U shaped insulating plate 19, a metal voltage-sharing shield insulation layer 20 covering outside the U shaped insulating plate 19 and a surrounding insulating layer 21 covering outside the metal voltage-sharing shield insulation layer 20. An oil gap 22 is formed between the surrounding insulating layer 21 and the metal voltage-sharing shield insulation layer 20. In the leading-out device 13, the U shaped insulating plate 19 is formed by colligating two semi-arc insulating paper plates, which are fixed on the two upper and lower support arms 18 respectively. The two semi-arc insulating paper plates are set oppositely, and can form a whole after the colligation. From the front view or side view, the upper part of the two semi-arc insulating paper plates forming a whole appears a U shape.

Figure 16:
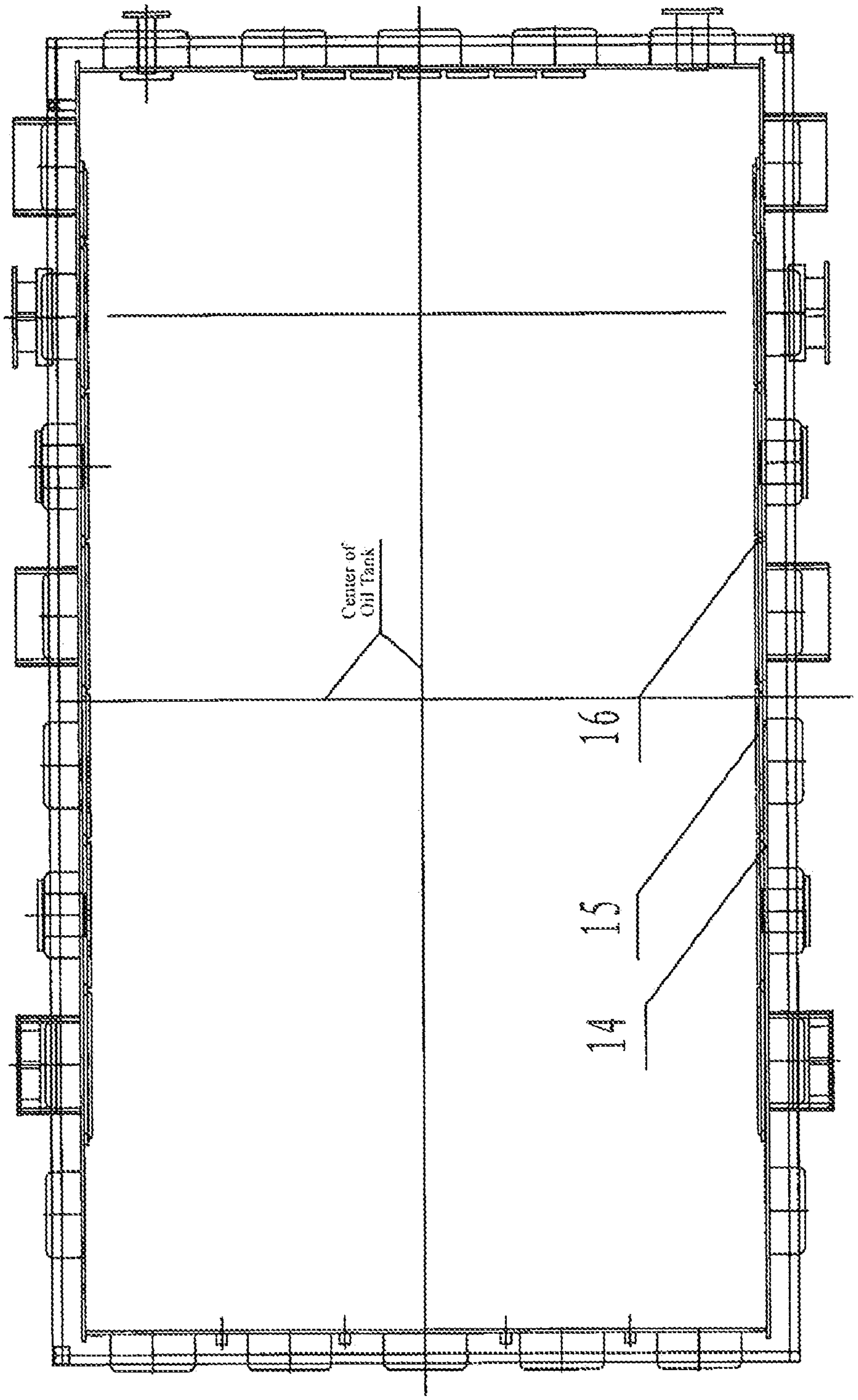
FIG. 16 is a top view of a structure of an oil tank in the embodiment of the present invention.
Figure 17:
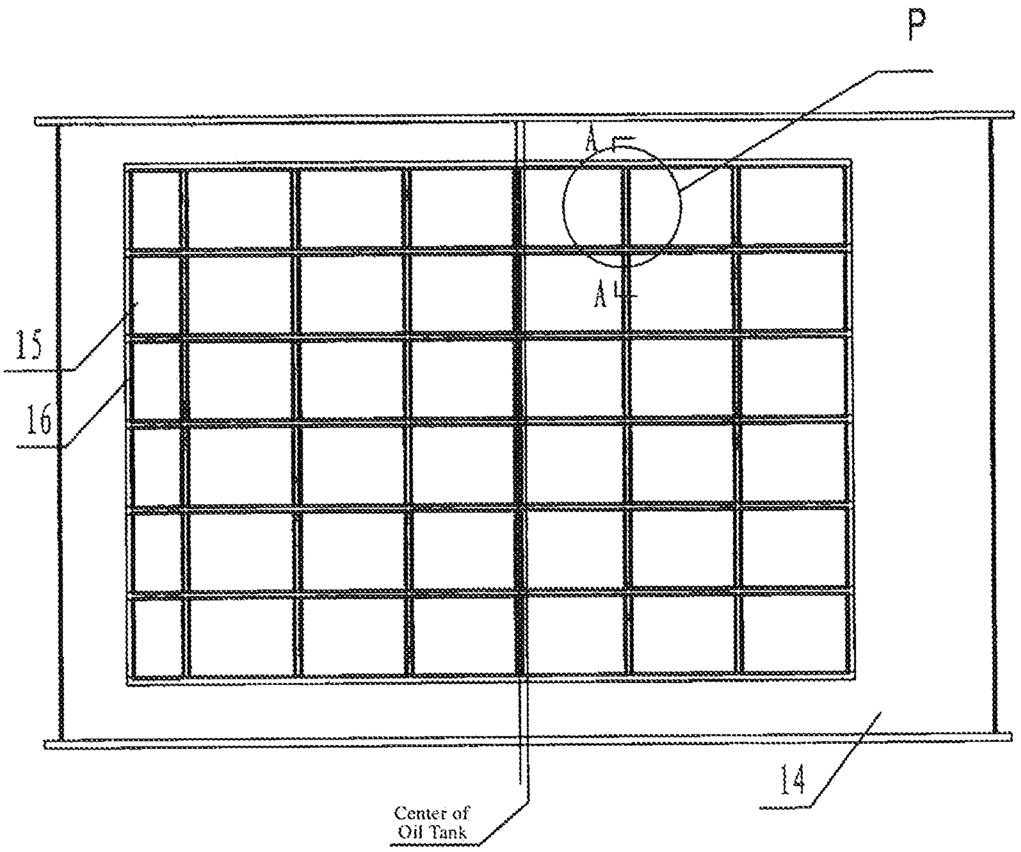
FIG. 17 is a plan view of the structure of the oil tank wall in FIG. 16.
Figure 18:
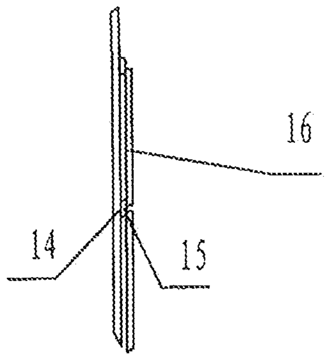
FIG. 18 is a view in the A-A direction in position P in FIG. 17.

As shown in FIGS. 16 to 18, both of the double active parts of the reactor in this embodiment are placed in the oil tank of the reactor. The structure of the oil tank is a structure in which a double-layer oil tank wall can be used locally. As shown in FIG. 16, the part of the oil tank wall 14 right opposite to the reactor active part (i.e. close to the iron core side yoke) can use the structure of double-layer oil tank wall.

In this embodiment, the oil tank 6 is made of steel material, and the shape of the oil tank 6 is rectangular or square. In the oil tank 6, the thickness of the oil tank wall 14 is 6-16 mm, the thickness of the bottom is 20-60 mm, and the thickness of the cover is 10-40 mm.

As shown in FIGS. 17 and 18, a plurality of transverse-longitudinal crossed metal battens 15 are soldered on the inner surface of the oil tank wall 14. These metal battens 15 construct a plurality of rectangular frames. A plurality of rectangular steel plate then is soldered on the rectangular frames of the metal battens 15 correspondingly. The rectangular steel plates construct the second oil box wall 16. In the oil tank 6, the thickness of the batten 15 is 4-50 mm, and the thickness of the second oil box wall 16 is 4-20 mm.

As shown in FIG. 8, four sets of radiators 5 are connected to the oil tank 6 of the reactor in the present invention. The radiators 5 are distributed in two sides of the oil tank 6 symmetrically.

The invention claimed is:

1. An iron core reactor comprising a reactor active part, wherein the reactor active part comprises two or more separate active parts, coils in the active parts are connected together, the active parts of the reactors are placed in a same reactor oil tank, the structure of the reactor oil tank is a structure in which double-layer oil tank wall is used locally, that is, a plurality of battens are set on the inner surface of an oil tank wall, and a second oil tank wall is fixed on the battens.

2. The iron core reactor according to claim 1, wherein the coils in the active parts can be connected together in series, and also can be connected together in parallel.

3. The iron core reactor according to claim 2, wherein when two active parts are used in the reactor, the manner of coupling the coils in the two active parts together in series can be that one end of the first coil in the first active part is a leading-in end, the other end of the first coil is connected to one end of the second coil in the second active part, and the other end of the second coil is a leading-out end, thereby a serial connection is formed; the serial connection also can be that the first coil is connected to the second coil in series by using leading-in wires in the middle of the coils, i.e., the first coil employs a leading-in wire in the middle of the first coil and leading-out wires in both ends of the first coil, and the leading-out wires of the first coil are connected in parallel to be a leading-in wire of the second coil, the second coil employs the leading-in wire in the middle of the second coil and leading-out wires in both ends of the second coil, the leading-out wires in both ends of the second coil are connected in parallel, and the parallel connection between the leading-out wires in both ends of the first coil is connected to the leading-in wire in the middle of the second coil in series.

4. The iron core reactor according to claim 2, wherein when two active parts are used in the reactor, the manner of coupling the coils in the two active parts together in parallel can be that the ends of the coils are connected in parallel, i.e., one end of each of the two coils in the two active parts is a leading-in end thereof and is connected together in parallel as a leading-in end, the other end of each of the two coils in the two active parts is a leading-out end thereof and is connected together in parallel as a leading-out end; the parallel connection also can be that both of the first coil in the first active part and second coil in the second active part employ leading-in wires in the middle of the coils, and the leading-in ends in the middle of the two coils are connected in parallel, the upper end and the lower end of each coil are connected together in parallel respectively and then the parallel connections of the two coils are connected in parallel as a leading-out end, that is, the first coil employs a leading-in wire in the middle of the first coil, the upper end and the lower end of the first coil are the leading-out ends and are connected in parallel, the second coil employs a leading-in wire in the middle of the second coil, the upper end and the lower end of the second coil are the leading-out ends and are connected in parallel, the leading-in ends in the middle of the first coil and the second coil are connected in parallel, and the two ends of the first coil and the two ends of the second coil are connected in parallel as a leading-out end.

5. The iron core reactor according to claim 1, wherein the active parts of the reactor are arranged in parallel or in-line.

6. The iron core reactor according to claim 1, wherein each of the respective active parts of the reactor comprises an “EI” shaped iron core respectively; and in the middle of the each “EI” shaped iron core, an iron core limb is formed by the lamination of a plurality of iron core cakes with central holes and a plurality of air gaps.

7. The iron core reactor according to claim 1, wherein leading-out devices of the coils in the active parts are connected to the respective active parts of the reactor directly.

8. The iron core reactor according to claim 7, wherein the leading-out devices are connected to a position on the external diameter of the coils in the active parts of the reactor, the leading-out device comprises a U-shaped insulating plate, and a metal voltage-sharing shield insulation layer covering outside the U-shaped insulating plate.

9. The iron core reactor according to claim 8, wherein the leading-out device further comprises a surrounding insulating layer covering an outside of the metal voltage-sharing shield insulation layer, and an oil gap is formed between the surrounding insulating layer and the metal voltage-sharing shield insulation layer.

10. The iron core reactor according to claim 1, wherein the battens include transverse battens and longitudinal battens, which form a plurality of grids, the second oil tank wall is constructed by covering plates whose sizes correspond to the sizes of the grids on the grids.

11. The iron core reactor according to claim 10, wherein the batten is made of metal, the thickness of the batten is 4-50 mm, and the thickness of the second oil tank wall is 4-20 mm.

12. The iron core reactor according to claim 1, further including radiators connected to the reactor oil tank.

13. The iron core reactor according to claim 12, wherein the radiators are distributed on one side or on two sides of the reactor oil tank symmetrically, or around the reactor oil tank.

* * * * *